Patented June 16, 1931

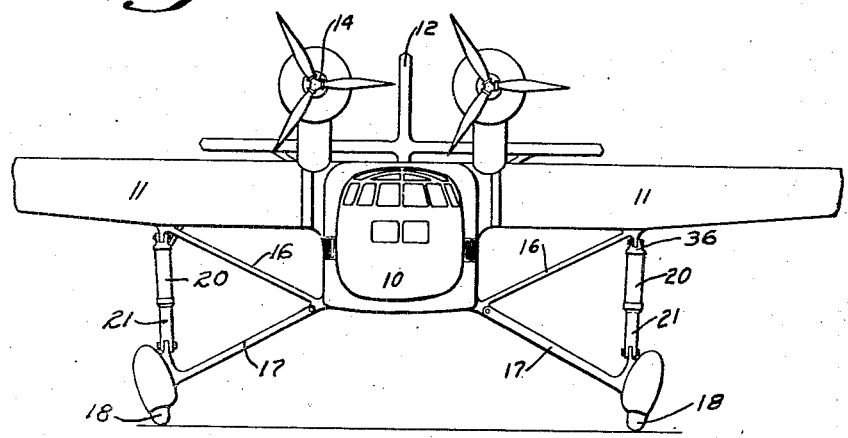

1,810,244

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE

Application filed May 6, 1930. Serial No. 450,148.

The object of my invention is to provide an airplane having an adjustable landing gear whereby the position of the plane relative to the ground may be varied.

A further object of my invention is to provide an adjustable landing gear of the class described which may be conveniently operated by the pilot from the airplane's cockpit. This device is primarily adapted for large airplanes of the transport type. The fuselage of such airplanes have relatively large ground clearances when in a position for taking-off or landing so that a portable ladder or gangplank must be provided for the passengers when entering or leaving the plane. In my improved construction the fuselage of the ship may be lowered so that it is just barely above the ground thereby making it very convenient for the passengers to enter or leave the plane. It will be understood that the minimum ground clearance for planes of this type is from four to six feet which makes the entering or exit of passengers difficult. With this device the minimum ground clearance is maintained when the plane is taking-off or landing, the fuselage being lowered practically to the ground just before the passengers are about to enter or leave the plane.

A further purpose of this invention is to provide means whereby the overall height of the plane may be reduced so that it may be stored in existing hangar buildings in which ordinarily the plane could not enter.

Transport planes of the type herein shown are provided with motors and propellers placed above the main wing so that their total height sometimes exceeds the height of the ordinary hangar doors. The airplane hangars used in connection with most of the large air lines, including the Transcontinental Air Transport and the National Air Transport, are equipped with standardized doors having a clearance of slightly less than twenty feet in height. This clearance is ample for the moderate size planes now used but is not sufficient to accommodate the larger types of transport planes now being produced. These larger planes although possessing features very desirable for use on such air lines are still prohibited by the inadequate height of the hangar doors. When such large planes are equipt with my improved type landing gear they may be conveniently lowered when about to enter the hangar so that their use in connection with these air lines is feasible and practical.

The plane shown in the drawings has an overall height of slightly over twenty-two feet when in its taxiing position but this height is reduced to about nineteen feet when my landing gear is raised thereby allowing this plane to enter twenty-foot hangar doors.

I accomplish this desired result by providing a telescopic landing gear strut which consists generally of a piston and cylinder, which strut normally acts as a shock absorber for the landing gear. The piston is held in its extended position by air pressure controlled from the pilot's cockpit. When it is desired to lower the ship the air pressure in the cylinder is reduced so that the strut gradually shortens. Due to the natural cushioning of this pneumatic device, an excellent shock absorber is provided which normally operates through a range of about one quarter of the total movement of the members. However, if forced landings are to be made on rough ground the air pressure in the cylinder may be reduced so that a very flexible landing gear is provided to thereby absorb the impacts encountered when landing.

With these and other objects in view my invention consists in the arrangement, construction, and combination of the various parts of my improved device, as described in the specification, claimed in my claim, and illustrated in the accompanying drawings, in which:

Figure 1 shows a front elevation of an airplane constructed in accordance with this invention.

Figure 2 shows a side elevation of the plane shown in Figure 1, the device being illustrated in its lowered position by dotted lines.

Figure 3 shows a sectional view through the shock absorbing element, and

Figure 4 shows an enlarged view of the rebound controlling valve used in the device shown in Figure 3.

Referring to the accompanying drawings, I have used the reference numeral 10 to indicate the fuselage of a type of airplane known as a high wing monoplane. This plane is provided with a single wing 11 extending from each side of the fuselage, a rudder 12, and control surfaces 13. I have provided a plurality of motors 14 mounted above the upper surface of the wing 11 to propel the plane in the conventional manner.

The rear end of the fuselage 10 is provided with a tail wheel 15 while the forward portion thereof is supported on my improved landing gear. Diagonal struts 16 extend from the lower corners of the fuselage up to the under side of the wing and axle shafts 17 are pivotally connected to the fuselage adjacent to the fittings connecting the struts 16, which axles are provided with landing wheels 18 rotatably mounted on the outer ends thereof. My improved shock absorber elements extend between the outer ends of the struts 16 and the axles 17 so that the pivotal movement of these axles will be accompanied by the telescoping of the shock absorbing members. Braces 19 extend from the wheels 18 to the rear portions of the wing 11 to which they are pivotally connected to support the landing gear when the brakes are applied to the wheels 18.

The shock absorber assemblies extending between the wheels 18 and the upper ends of the struts 16 each consist of a tubular housing 20 having a cap 36 secured over its upper end which cap is pivotally secured to the upper end of the strut 16. A sleeve 21 is reciprocally mounted in this housing the lower end of which is pivotally secured to the axle 17 adjacent to the wheel 18. A rod 22 is fixedly secured within the cap 36 and extends downwardly into the sleeve 21 where the piston 23 is secured thereto which operates within the bore of the sleeve 21. The upper end of the sleeve 21 within the housing 20 is provided with a ring shaped piston 24 which coacts with the bore in the housing 20. It may thus be seen that when the sleeve 21 is forced into the housing 20 compression of the fluid within the two sleeves resists this force.

I have provided a fitting 25 screwed into the upper part of the housing 20 which connects with a valve 26 and pipe line 27. The pipe line 27 extends up through the wing 11 and into the fuselage 10 where it connects with an air reservoir or tank 28 which reservoir is supplied from an air pump 29 driven direct from one of the airplane engines. An air gauge 30 is provided in connection with the tank 28 so that the pressure in this tank may readily be known to the pilot. I have provided the valve 26 adjacent to the housing 20 to guard against the results otherwise caused if the tube 27 should burst. Remote control apparatus is provided for operating these valves from the pilot's cockpit so that the plane may be controlled entirely from within.

When the airplane is in its lowered position, as illustrated by dotted lines 31 in Figure 2, the sleeve 21 is fully inserted in the housing 20. However, when the pilot operates the valves 26 the air under pressure in the reservoir 28 enters above the piston 24 thereby gradually forcing the sleeve 21 from the housing so that the plane rises to the position shown by solid lines in the above figure. The pneumatic pressure within the housing 20, of course, forms a resilient cushioning device so that as the plane takes-off the wheels 18 are allowed a considerable vertical movement to compensate for irregularities in the field.

It will be apparent that when the plane is in its lowered position its overall height will be materially decreased and that the doorway 37 of the fuselage will be lowered to a position so that passengers may enter or leave the plane conveniently.

Such a pneumatic landing gear must be provided with some device for checking the rebound of the wheels and I have, therefore, provided a hydraulic means for accomplishing this rebound checking action. The piston 23 is provided with several ports 32 which extend from top to bottom through the piston thereby allowing free access of the fluid from one side of this piston to the other. The sleeve 21 is filled with oil so that as this sleeve is compressed into the housing 20 the oil therein will be forced through the ports 32. A conical shaped valve 33 is reciprocally mounted on the rod 22 above the piston 23 and a spring 34 urges this valve into contact with the top of the piston so as to prevent the flow of oil from the upper end of the piston back into the sleeve 21.

From the foregoing it may be seen that when the sleeve 21 is compressed into the housing 20 the oil therein will be forced up through the ports 32 thereby forcing the valve 33 upwardly against the spring pressure 34. Little or no resistance is offered by the oil in this direction of movement so that practically all of the compression pressure is resisted by the air pressure within the housing 20. However, when the rebound action occurs, the attempted withdrawal of the sleeve 21 from the housing 20 is resisted by the action of the valve 33 closing the ports 32.

I have provided bleader ports 35 through the valve 33 which allows a small quantity of oil to flow through this valve member. The sleeve 21 can only be withdrawn from the housing 20 in proportion to the oil flowing through these bleader ports so that the rebound of the landing gear is effectively prevented.

Among the many advantages arising from the use of my improved device it may be well to mention that planes equipt with my landing gear may be conveniently lowered so that passengers can enter or leave the plane without the use of gangplanks, portable ladders or the like. Further, the plane may be lowered so that large ships may enter through existing hangar doors which previously were barriers for such size of planes. Still a further feature resulting from the use of this device is that the air pressure in the shock absorber may be adjusted so that in case of a forced landing exceptional resiliency is obtained to protect the plane against damage.

Some changes may be made in the arrangement, construction, and combination of the various parts of my improved device without departing from the spirit of my invention, and it is my intention to cover by my claim, such changes as may reasonably be included within the scope thereof.

I claim as my invention:

In an airplane construction, a fuselage, a landing gear, telescopic shock absorbers supporting said fuselage on the landing gear, said shock absorbers having hydraulic means for checking the rebound of the landing gear and pneumatic means resisting the compression thereof, and an auxiliary source of compressed air under the control of the pilot while operating the airplane for varying said pneumatic compression resistance, whereby the pilot may vary the operating stroke of the shock absorber to suit the character of the landing field.

HAROLD A. HICKS.